UNITED STATES PATENT OFFICE.

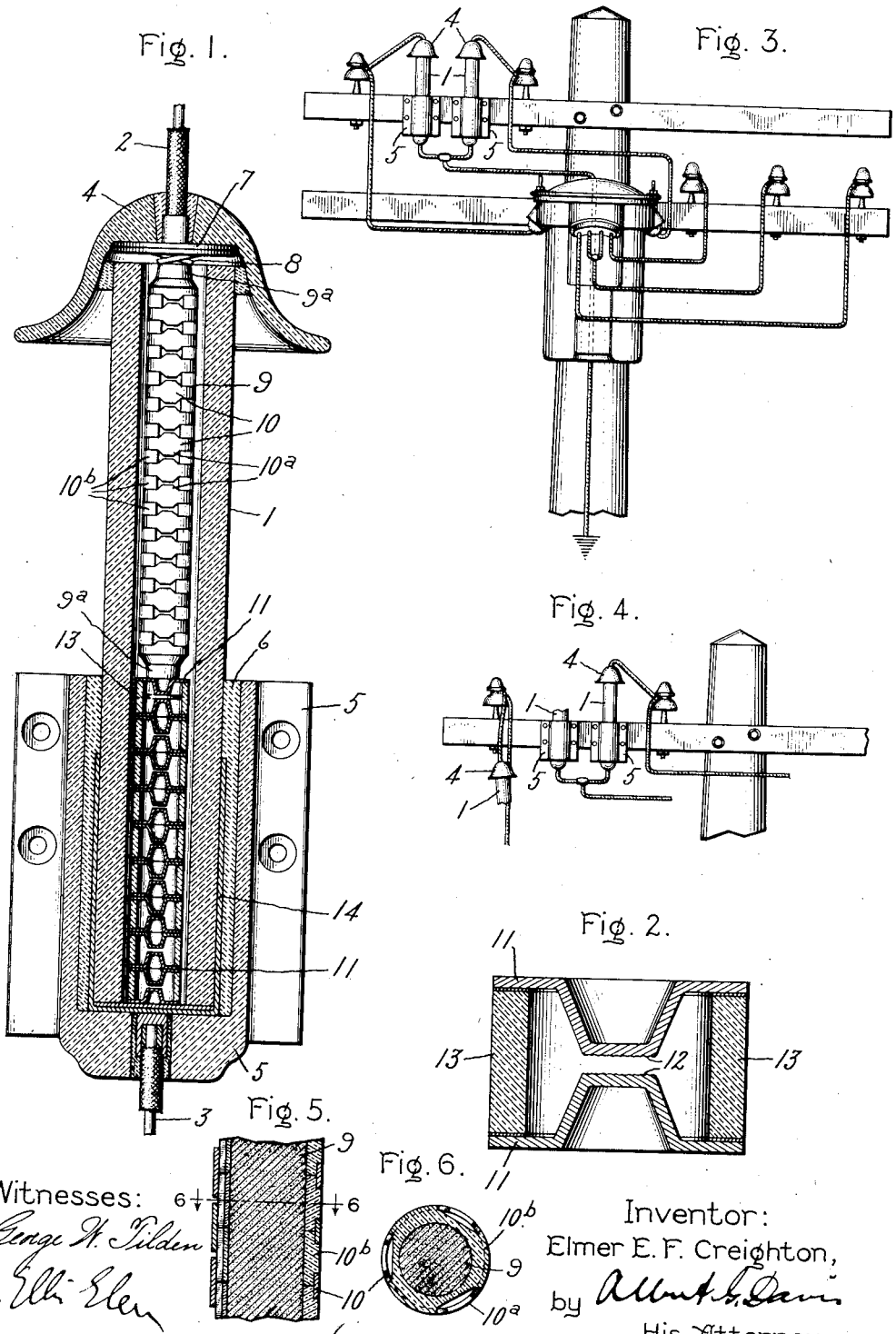

ELMER E. F. CREIGHTON, OF SCHENECTADY, NEW YORK, ASSIGNOR TO GENERAL ELECTRIC COMPANY, A CORPORATION OF NEW YORK.

PROTECTIVE DEVICE.

1,213,844.     Specification of Letters Patent.     Patented Jan. 30, 1917.

Application filed May 2, 1912. Serial No. 694,776.

*To all whom it may concern:*

Be it known that I, ELMER E. F. CREIGHTON, a citizen of the United States, residing at Schenectady, county of Schenectady, State of New York, have invented certain new and useful Improvements in Protective Devices, of which the following is a specification.

My invention relates to protective devices, such as lightning arresters, for protecting electrical apparatus against abnormal voltages and surges, and more particularly to lightning arresters of the type in which a number of gaps in series prevent flow of current at the normal voltage of the line but permit an abnormal voltage to discharge through the gaps to ground.

For complete protection of the electrical apparatus of a distribution system against abnormal voltages, surges, high frequency oscillation and other electrical disturbances commonly known as lightning, each piece of apparatus should be provided with a protective device, but in many installations complete protection would require so many protective devices that the cost is prohibitive. In such cases the protective devices available are distributed over the system to be protected, but the protection secured in this manner is not always sufficient. More complete protection than can be secured by protective devices placed at comparatively great distances apart is particularly necessary in distribution systems containing large numbers of small transformers, these transformers usually being mounted on poles at different points on the distribution system. In such cases it is very desirable that each transformer be provided with an efficient form of lightning arrester, but heretofore such protection has not been feasible on account of the cost.

The object of my invention is to provide an inexpensive and efficient protective device which will be cheap enough to warrant its installation for the protection of apparatus of comparatively low cost; which is waterproof and uninjured by exposure to the weather, so that it is especially suitable for protecting transformers mounted on poles and can be placed on the same pole as the transformer and immediately adjacent the transformer; which will automatically break in such a manner as to form a large gap between the line and ground in case of a continuous discharge through the arrester to ground; which has as high a discharge rate as possible so that abnormal potential will be quickly removed from the distribution system; in which the arc extinguishing effect is much greater than in the multigap lighting arresters commonly used; in which the discharge gaps are built up in the form of units providing more discharge surface than the cylinders of the ordinary type of multigap and so constructed that relative displacement of the electrodes is highly improbable; in which the electrodes are so formed that a discharge heavy enough to melt them will not cause a metallic bridge to be formed from line to ground; and which is in many particulars hereinafter set forth an improvement in protective devices of this general character.

My invention, which comprises the various modifications and improvements more particularly pointed out hereinafter and defined in the appended claims, will best be understood in connection with the accompanying drawings which, merely for the purposes of illustration, show one of the numerous forms in which my invention may be embodied and in which—

Figure 1 is a longitudinal section of an improved protective device or lightning arrester embodying my invention; Fig. 2 is a sectional view of one of the units consisting of two electrodes properly spaced to form a spark gap; Fig. 3 is a view showing the arrester in position on the pole; Fig. 4 is a view showing the position of the parts when the arrester has been broken by a continuous discharge and a large gap is formed in the path from the line to ground as a result of the breaking of the arrester; Fig. 5 is a longitudinal section of part of the resistance rod 9, showing the porcelain rings and the metal rings on the rod; and Fig. 6 is a cross section on the line 6—6 of Fig. 5.

In the particular form of protective device shown in the drawings, the discharge path to ground comprises a number of spark gaps which are so proportioned that an abnormal voltage can discharge through them to ground but the normal voltage of the line is not great enough to maintain a flow of current through the gaps. The spark gaps are between metal electrodes spaced a short distance from one another. A very heavy flow of current may melt metal electrodes and weld them together to such an extent that a solid conducting bridge from the line to ground is formed, and in order to keep the flow of current through the arrester within limits some current limiting means, such as a resistance, is placed in series with the spark gaps, but this resistance is kept low in order that the abnormal voltage on the line may discharge through the arrester as freely as possible.

In an arrester constructed in accordance with my invention the spark gaps and the resistances in series with them are inclosed in a tube 1, preferably made of porcelain or other suitable insulating material. This tube is so designed that it will crack and break off if excessive heat is applied to it. The tube is tightly sealed, so that the parts inside of it are thoroughly protected from water and from the weather. At one end the arrester is connected to the line by a lead 2 and at the other end the arrester is connected to ground through a suitable ground connection 3. In some cases the lead 2 may be connected to ground and the lead 3 to line. In the specific arrangement shown in the drawings the upper end of the tube is closed by a cap 4 made in any suitable form, such as a bell, to shed rain. Through this cap the lead 2 to the line extends, while the lower end is closed by a cap or socket 5 containing a recess into which the lower end of the tube is cemented by some suitable insulating cement 6. The particular form of arrester shown in the drawing is designed to be secured to the pole or cross arm on which the transformer is mounted, and therefore the cap or base 5 is provided with holes by means of which it may be secured in position on the cross arm.

When an abnormal voltage or surge appears upon the line it attempts to pass to ground through the windings of the transformer or other apparatus to be protected and also through the lightning arrester. The spark gaps break down, and permit the abnormal voltage to pass to ground, whereby the transformer or other apparatus is protected from injury. The flow of current is kept within limits by a series resistance, which is preferably made in the form of a resistance stick somewhat smaller than the base of the tube 1 and having one end connected to a terminal of the arrester and the other end to the spark gaps. In the particular arrangement shown, connection with the line is made by means of a contact plate 7, secured in the cap 4 and having a spring 8 which firmly engages and presses upon the end of a large resistance stick or rod 9 placed longitudinally in the tube. The discharge to ground of very high potentials is facilitated by providing a discharge path in shunt to the resistance rod 9, so the discharge can flow through the shunt path as well as through the resistance rod. Various forms of shunt path may be used, but in the preferred construction the resistance rod is provided with metal rings or sleeves 10 strung along the rod and insulated from it. These rings or sleeves are held in place on the rod by metal caps 9ª secured to the ends of the rod in any suitable way, as by being spun on the ends of the rod. The rings 10 are separated from one another by spark gaps of suitable size and are so proportioned as to have that amount of capacity which is best adapted to facilitate discharge of high frequency surges to ground. Upon the occurrence of conditions which cause a heavy flow of current to ground, a part of the current will pass through the resistance rod 9 while the remainder will pass through the shunt path by flowing through the sleeves or rings 10 and through the air gaps between the rings.

The rings or sleeves 10 may be constructed in various ways and may be insulated from the rod 9 in any suitable manner, but the preferred construction is that shown in the drawings in which the rings 10 are some distance apart and each ring is provided on the edges with extensions 10ª which form the electrodes of spark gaps of the proper size between the rings. As more clearly appears from Fig. 6, each of the rings 10 is provided with three extensions 10ª so that there are three spark gaps between each pair of rings.

The rings 10 are preferably insulated from the resistance rod 9 by insulating rings 10ᵇ preferably made of porcelain or similar refractory insulating material and cut away at points on the circumference, as best shown in Fig. 6, to provide a considerable space beneath the spark gaps formed by the extensions 10ª on the rings 10. These cut away portions of the porcelain rings 10ᵇ are proportioned to make the leakage surface from one ring to the other fully as great at the spark gaps between the extensions 10ª as at any other point between the rings. As best shown in Fig. 5, the porcelain rings 10ᵇ have recesses near the edges into which the metal sleeves or rings 10 fit, so that when the metal sleeves 10 and the rings 10ᵇ are assembled in place on the rod 9 and are clamped in position between the caps 9ª, the metal sleeves 10 are firmly held in position by the porcelain rings 10ᵇ and at the same time are insulated from the resistance rod 9. As the spark gaps between the rings are very close to the walls of the tube 1, the discharge through the gaps is not only shunted by the resistance rod 9 but is also strongly cooled by the walls of the tube 1 and, therefore, is quickly extinguished.

Conditions may arise which will cause a continuous discharge through the arrester to ground. This continuous discharge may, for example, be brought about if the distribution system comes in contact with a conductor carrying current at a voltage very much higher than the normal voltage of the distribution system, in which case a heavy or continuous discharge to ground takes place through the arrester, or if the spark gaps are bridged in some way, the normal voltage of the distribution system may be sufficient to cause a heavy continuous flow of current to ground through the series resistance. In such cases the distribution system is practically grounded, and in order to relieve the system of the ground I provide, in accordance with my invention, means whereby the arrester will break under such abnormal and continuous discharges and will break in such a manner that the discharge path to ground is interrupted. In the preferred arrangement for accomplishing this result the resistance rod 9 is placed in thermal relation with the porcelain tube 1 so as to heat the tube as the resistance 9 becomes hot. The rod 9 is usually made of carborundum or similar refractory material of high resistance, and a heavy flow of current through it will quickly heat it to a very high temperature, thereby heating that part of the porcelain tube near the resistance and cracking it so that the upper part of the tube breaks off. Some suitable means is provided for putting the upper end of the tube under a stress which tends to separate it from the lower part, so that when the tube breaks in two the upper end will automatically be moved some distance away from the lower end, thereby making a very large gap in the path from line to ground. The preferred construction is that shown in which the connection to the line exerts a stress upon the upper end of the tube and pulls it away from the lower end when the tube breaks off, whereupon the upper part of the arrester and the resistance rod swing off to one side, as shown in Fig. 4, thereby leaving a large gap in the connection to ground and at the same time clearly showing that the arrester has been broken and must be replaced.

The spark gaps in series with the resistance rod 9 may be of any suitable form but in the preferred construction, best shown in Fig. 2 of the drawing, electrodes 11, made of thin sheets or disks of sheet metal suitably dished or concaved, are spaced so as to leave a spark gap between them. Each spark gap is made in the form of a unit comprising two electrodes mounted so as to bring their discharge surfaces 12 adjacent each other. These discharge surfaces are preferably roughened in some suitable way, as by knurling, and offer a greater surface for discharge than the discharge surfaces of the cylindrical electrodes generally used for spark gaps. The electrodes are spaced away from each other by some suitable spacer, such as a ring 13, which engages the electrodes 11 near their edges to form a substantially closed chamber containing the spark gap between the discharge surfaces 12 of the electrodes 11. For all ordinary conditions the spacer or ring 13 may be made of porcelain. As the electrodes 11 and the spacers 13 are of a diameter only slightly less than the bore of the tube 1 they cannot be displaced laterally to any appreciable extent. When a discharge occurs from one electrode to the other through the spark gap, the air or other dielectric in the spark gap is heated and as the electrodes 11 with the spacer 13 form a closed chamber from which air can escape only with difficulty, the heating of the dielectric increases its pressure, which in turn increases its tendency to extinguish the discharge through the spark gap. In some cases it is desirable to cement the electrodes 11 to the spacers 13, so that the two electrodes of each unit are rigidly held in proper relation to form a sealed unit. A number of the spark gap units, each consisting of a spacer 13 and two electrodes 11 can be assembled one on top of the other, as shown in Fig. 1, without any danger of displacement of the electrodes or alteration in the length of the spark gap.

Under some conditions it may be desirable to provide a discharge path in shunt to the spark gap. An easy way of providing such a shunt path is to make the spacer 13 of carborundum or some compound of carborundum so proportioned as to offer high resistance to current flow at the normal voltage of the arrester but to break down and permit comparatively free current flow at higher voltage. With carborundum spacers a very high voltage discharge can pass to ground, not only through the spark gaps, but also through the spacers.

The spark gap construction used in this arrester decreases the tendency to the formation of short circuits from line to ground on heavy discharges as the thin metal electrodes 11 are not nearly so apt to spatter molten metal across the spark gap and thereby bridge the gap, as are solid electrodes. The ability of an arrester of this type to extinguish the arc which is formed by high potential discharge depends to a large extent upon the number of spark gaps and in order to make the number of gaps as great as possible and at the same time permit the gaps to break down upon a slight increase in voltage above the normal voltage of the line, I increase the number of gaps and then make each gap break down more easily by suitable means, such as metal rods or antennæ 14, which are connected to one terminal of the arrester and extend along the gaps in a position to exert an electrostatic influence on the gaps and thereby influence their breakdown voltage. The electrostatic capacity of the electrodes toward the antenna is considerable as compared to the electrostatic capacity between adjacent electrodes. The preferred form of antennæ is that shown in the drawing, and consists of a U-shaped metal strip 14 connected to the ground lead 3 and extending along the outside of the tube 1 over the greater portion of the spark gaps. I prefer to make the length of the antennæ equal to about seven-eighths of the total length of the number of spark gaps used. When the lead 2 is connected to ground and lead 3 to line the antennæ 14 are line antennæ and the rod 9 is a ground antennæ for the spark gaps between the sleeves 10.

The arc extinguishing power of the arrester is further increased by the cooling action of the porcelain tube 1 which surrounds the gap units quite closely and assists in extinguishing any arcs which are severe enough to cause an escape of air and arc gases from the interior of the gap units. In such cases the gases under high pressure lift the electrodes 11 away from the spacers 13 to a slight extent and come in contact with the walls of the tube 1, by which they are quickly cooled. The tube 1 is tightly closed at each end and the clearances in the tube are small, consequently any arcing causes the pressure of the air in the tube 1 to rise, whereby its arc extinguishing action is increased.

My invention may be embodied in many other forms than that shown and described, and I therefore do not limit it to the precise arrangement disclosed except in so far as it is limited by the scope of the appended claims.

What I claim as new and desire to secure by Letters Patent of the United States, is:—

1. In a protective device, a discharge path comprising a plurality of conducting members normally held in position by pressure on the end members and free to separate when relieved of said pressure, and a heat responsive support normally in contact with said end members to exert an endwise pressure thereon and hold all said members in normal relation and broken by abnormally high heat in said discharge path.

2. In a protective device, a discharge path comprising a plurality of conducting members and an insulating spacer placed end to end to form a column with two of said members separated by said spacer to form a spark gap, and a support for engaging the end members of said column and normally exerting an endwise pressure thereon to hold said members in position, said support being in thermal relation to said discharge path to relieve the endwise pressure on said conducting members and thereby leave said members free to separate.

3. A protective device comprising an insulating tube frangible by local heating, a discharge path in said tube comprising a resistance rod and electrodes spaced apart to form a spark gap and means in engagement with said tube for exerting a pressure on the end of said rod to hold it in contact with one of said electrodes and produce a stress which tends to elongate said tube whereby abnormal heating of said resistance rod produces fracture of said tube and leaves said resistance rod free to separate from said electrode.

4. A protective device comprising a plurality of spark gap units each comprising a closed chamber containing an insulating fluid and electrodes spaced apart in said chamber to form a spark gap in which the dielectric is put under pressure by a discharge through said gap, and a closed container inclosing said spark gap units with slight clearance to assist in extinguishing the arcs in said gaps.

5. A protective device comprising a plurality of spark gap units mounted one on top of the other, each unit comprising insulating walls and metal ends in engagement with said walls to form a pressure retaining chamber, said metal ends forming the electrodes of a spark gap in said chamber, a sealed porcelain tube encircling said units with slight clearance, a resistance rod in said tube with one end in engagement with said series of units, and resilient means for engaging the other end of said resistance rod to hold said rod and said units firmly in place.

6. A protective device comprising a porcelain tube closed at both ends, a discharge path through said tube comprising a resistance rod, and an arc extinguishing portion in series with said rod, said arc extinguishing portion comprising a plurality of spark gap units, each unit comprising two sheet metal electrodes, and an insulating spacing ring between said electrodes and in engagement with the edges thereof to form with said electrodes a pressure retaining chamber, said electrodes being dished toward each other at the middle to form discharge surfaces.

7. A protective device comprising an insulating tube closed at the ends, a discharge path through said tube comprising a resistance rod in series with a plurality of electrodes spaced apart to form a plurality of spark gaps, means for connecting one end of said discharge path to line and the other end to ground, and a metal conductor connected to ground and extending along said tube over about seven-eighths of said spark gaps.

8. A protective device comprising an insulating tube closed at the ends, a discharge path through said tube comprising a resistance rod in series with a plurality of electrodes spaced apart to form a plurality of spark gaps, means for connecting one end of said discharge path to line and the other end to ground, and a metal yoke connected to ground and extending along the exterior of said tube a distance equal to about seven eighths of the total length of the spark gap portion of said discharge path.

9. In a protective device, a discharge path comprising a resistance rod, an insulating tube surrounding said rod, and metallic electrodes positioned along said rod on said tube and spaced apart to form spark gaps.

10. In a protective device, a discharge path comprising a resistance rod, a plurality of electrodes mounted side by side on said rod and insulated therefrom, said electrodes being spaced apart to form spark gaps, and means for electrically connecting the end electrodes to said resistance rod.

11. In a protective device, a discharge path comprising a resistance rod, metal sleeves encircling said rod and spaced apart to form spark gaps, and insulating supports mounted on said rod to support said sleeves, said insulating supports being proportioned to render the leakage surface from one sleeve to the next equal at all points on the circumference of said sleeves.

12. In a protective device, a discharge path comprising a resistance rod, a plurality of metal sleeves encircling said rod and each provided with a projection at the edge, said sleeves being positioned to bring the projection on each sleeve adjacent the similar projection on the next sleeve whereby said projections form the electrodes of a spark gap, and insulating supports between said sleeves and said rod, said supports having radial depressions adjacent the extensions on said sleeves.

13. In a protective device, a discharge path comprising a resistance rod having a metal cap at each end, a plurality of porcelain supporting rings strung upon said rod, each of said rings having a radial depression therein, and a plurality of metal sleeves mounted upon said porcelain rings and spaced apart by them each of said metal sleeves having a projection on the edge in alinement with the radial depression in its supporting porcelain ring whereby each spark gap between said metal sleeves is in the depression of the porcelain supporting rings.

14. In a protective device, a discharge path comprising a resistance rod, and a plurality of metal sleeves surrounding said rod and spaced apart to form a plurality of spark gaps in parallel with said rod, said sleeves being so proportioned that the electrostatic capacity between any sleeve and the rod or earth is large as compared to the capacity to the adjacent sleeves.

In witness whereof, I have hereunto set my hand this 30th day of April, 1912.

ELMER E. F. CREIGHTON.

Witnesses:
BENJAMIN B. HULL,
HELEN ORFORD.